Nov. 10, 1953 P. B. HOYE 2,658,976
AIR CIRCUIT INTERRUPTER
Filed Dec. 3, 1948 7 Sheets-Sheet 1

Inventor:
PEDER B. HOYE
BY Brown, Jackson, Boettcher & Dienner
Attorneys:

Nov. 10, 1953 P. B. HOYE 2,658,976
AIR CIRCUIT INTERRUPTER
Filed Dec. 3, 1948 7 Sheets-Sheet 2

Inventor:
PEDER B. HOYE
BY Brown, Jackson, Boettcher
& Dienner
Attorneys:

Nov. 10, 1953 P. B. HOYE 2,658,976
AIR CIRCUIT INTERRUPTER
Filed Dec. 3, 1948 7 Sheets-Sheet 4

Inventor:
PEDER B. HOYE
BY Brown, Jackson, Boettcher & Dienner
Attorneys:

Nov. 10, 1953 P. B. HOYE 2,658,976
AIR CIRCUIT INTERRUPTER
Filed Dec. 3, 1948 7 Sheets-Sheet 7

Inventor:
PEDER B. HOYE
BY Brown, Jackson, Boettcher & Dienner.
Attorneys:

Patented Nov. 10, 1953

2,658,976

UNITED STATES PATENT OFFICE 2,658,976

AIR CIRCUIT INTERRUPTER

Peder B. Hoye, Maywood, Ill., assignor to Electrical Engineers Equipment Co., Melrose Park, Ill., a corporation of Illinois Application December 3, 1948, Serial No. 63,662

45 Claims. (Cl. 200—145)

My invention relates to mechanism for opening electrical circuits on which a high voltage is impressed, and is particularly concerned with such mechanism as is adapted to open the circuits in air.

Where high voltages are employed, for example, 115,000 volts, it is most important that the circuit be interrupted very rapidly when any fault occurs in the circuit. It is an object of my invention to provide air circuit interrupting mechanism for heavy duty which can be actuated to open the interrupting mechanism quickly and to maintain it open.

It is a further object of the invention to provide an air circuit interrupter which is adapted to open quickly and to reclose instantaneously.

It is another object of the invention to provide such mechanism wherein an interrupter switch and a disconnect switch are employed in combination, and wherein there is common operating mechanism for both, said operating mechanism coordinating the opening and closing of the two switches. In the preferred form of such air circuit interrupting mechanism the operating mechanism is adapted selectively to actuate the interrupter switch alone or to operate the interrupter switch and disconnect switch in sequence, and the mechanism includes a rotatable insulating support for the interrupter switch. It is yet another advantage of the structure embodying my invention that means is provided at both ends of the rotatable insulating support to furnish turning moments so that less strain is put upon the insulator and so that its movement can be accelerated more rapidly.

It is another object of the invention to provide, for a switch having a pair of relatively movable contacts, actuating mechanism for one of said contacts, which mechanism, by movement of one of its members through a relatively short path, is adapted to move said one of said contacts through a relatively long path into engagement with the other contact.

It is another object of this invention to provide a disconnect switch comprising a movable blade and a stationary contact with the blade comprising an interrupter switch, or a plurality of interrupter switches in series with each other and with the stationary contact of the disconnect switch. As will become apparent from the detailed description which follows, the opening and closing of the interrupter switch takes place without any movement of the contacts of the disconnect switch. In the preferred form of the invention there is a common operating rod on which all of the movable contacts of a series of interrupter switches are carried for simultaneous opening and closing of said switches. Also, in the preferred form of my invention spring means is interposed between the housing for the interrupter units and the operating mechanism for the movable contacts to counteract the weight of the movable switch parts when the switches are so mounted as to have said parts movable in a vertical path.

It is another object of the invention to provide spring motor mechanism which provides high speed opening and closing of the arcing contacts of the interrupter switches, and which also provides a cushioning effect for the associated supporting structure.

It is still another object of the invention to provide for the motor means, mentioned immediately above, energizing means which is adapted, on closing movement of the movable arcing contacts of the interrupter switches, to provide sufficient energy to the motor means that it may subsequently move the movable arcing contacts at high speed out of engagement with the stationary arcing contacts without further energization by the energizing means.

In providing an aligned group of interrupter switches in series, I also provide individual vent means for each arcing chamber in order to eliminate arcing across two or more chambers. In the preferred form of the invention, arc extinguishing lining for each arc extinguishing chamber is so formed as to direct the flow of gases of combustion diagonally into the path of the arc and toward its individual vent means.

Provision is also made for a metallic conductive path from the contact inside of the arcing chamber of each interrupter switch to metallic parts on the outside of the switch, which parts are in contact with the outside atmosphere to reduce the flow of charging current through the fibrous insulating tube defining the arcing chamber. In the preferred form of the invention such path includes the vent means for the arcing chamber.

It is another object of my invention to provide, in a series of associated interrupter switches, means which may be put in tension in place of putting the relatively non-elastic housings of the switches in tension when gases of combustion result from arcing. In the preferred form of the invention, said means comprises one or more concentric insulating tubes which extend through all the housings and which are removable, together with all of the stationary contacts and insulating spacers for the latter, as a unit.

While the air circuit interrupting mechanism of my invention is particularly suitable where high voltages are employed, it is also well adapted for lower voltages and it may find a wide variety of applications. Other uses, objects and advantages of the invention will become apparent, or be obvious, from a consideration of the following detailed description when taken with the accompanying drawings in which:

Figure 8 is a diagrammatic showing of automatic means for releasing a latch for the crank means which is connected with the movable contacts of the interrupter switches.

Figures 1, 2:
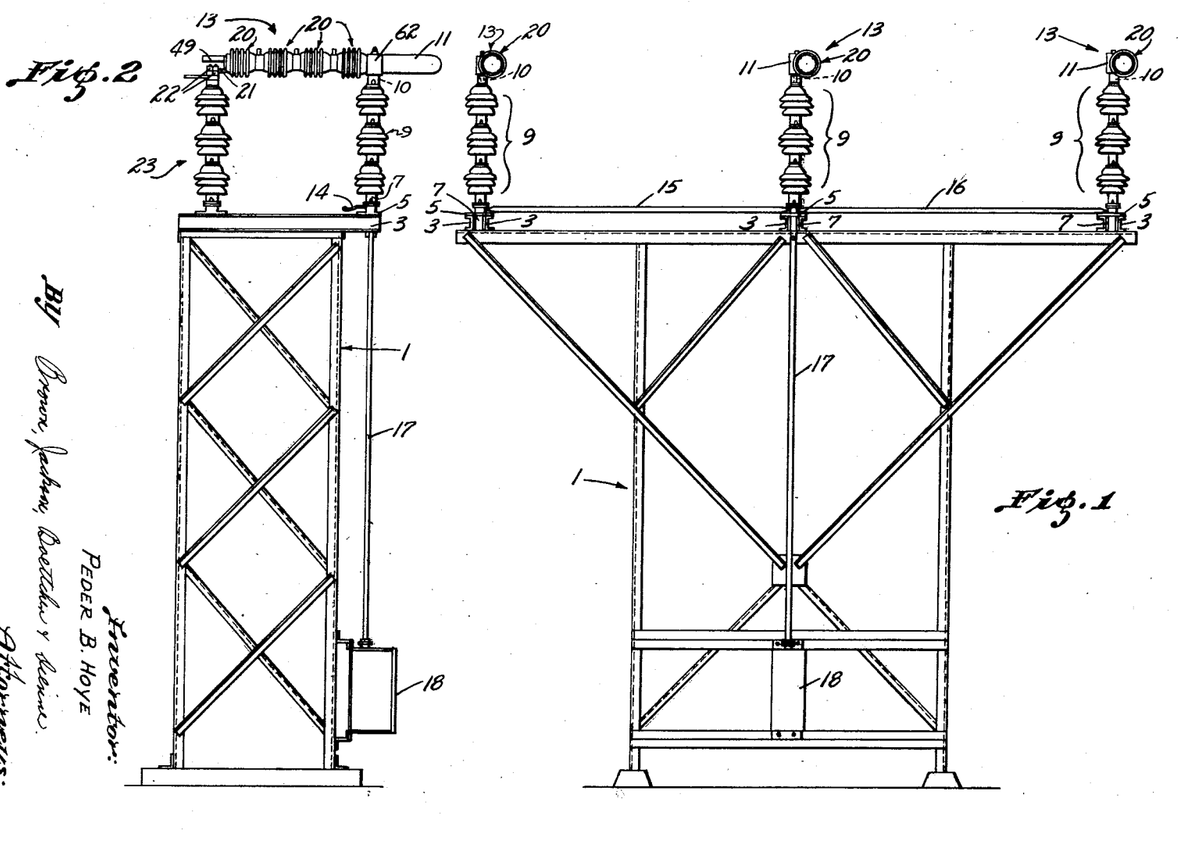
Figure 1 is a front elevational view of a plurality of the air circuit interrupter mechanisms of my invention mounted on a supporting framework and with a single operating mechanism for the plurality of mechanisms.
Figure 2 is a side elevation of the mechanisms and framework of Figure 1.
Figure 3:
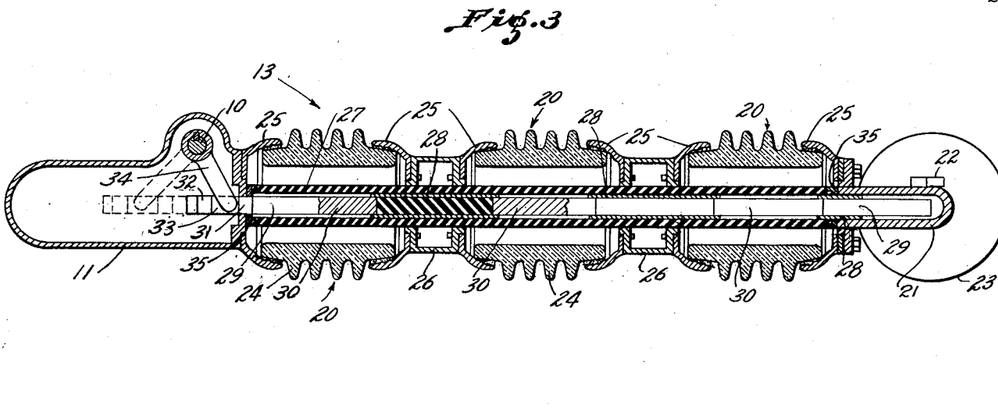
Figure 3 is a sectional view of a single air circuit interrupting mechanism of the type shown in Figures 1 and 2, said mechanism being a simplification of the preferred structure.

Referring now to Figures 1, 2 and 3 of the drawings, there will be seen a supporting framework, indicated generally by the reference numeral 1, which framework is made up of angle irons and I-beams which are secured together by welding, bolts or the like. Each of three pairs of I-beams 3 in spaced apart relation atop the framework 1 has a plate 5 carried on its top surfaces, and said plates are apertured to serve as a guide and bearing for stub shaft 7. Each stub shaft 7 is connected to a series of interconnected insulators 9 which insulators carry at their upper end a stub shaft 10 which extends into a housing 11 of the air circuit interrupting mechanism which is indicated generally by the reference numeral 13. Each mechanism 13 is pivotally mounted atop the supporting insulators 9, and is rotatable relative thereto. The insulators 9, and stub shafts 7 and 10 which are connected thereto, are also rotatable. Hereinafter said insulators and shafts will usually be referred to as an "insulating support." The purpose of the stub shaft 10 which extends into the housing 11 will become apparent hereinafter.

Each stub shaft 7 carries an arm 14 and the outermost shafts 7 of the group of three on the framework 1 are connected to the arm of the central stub shaft 7 by horizontal connecting rods 15 and 16. The center stub shaft 7 is, in turn, connected to a vertically extending connecting rod 17 which, at its lower end, extends into the housing 18 of automatic actuating mechanism (not shown). One form of such automatic mechanism is illustrated diagrammatically in Figure 8, and will be described hereinafter. The housing 18 for the automatic actuating mechanism is preferably connected to the framework 1 as shown.

Referring more particularly to Figures 2 and 3, it will be seen that the housing 11 is connected to one of a series of interrupter switches, each of which is identified by the reference numeral 20. Although reference is made to series of interrupter switches in series, it is to be understood that the invention contemplates, as well, the use of a single interrupter switch 20. The interrupter switches are aligned on their longitudinal axes, and are connected electrically in series. At the left end of the mechanism 13, as viewed in Figure 2, there is a metallic extension 21 electrically connected to a stationary contact of the adjacent interrupter switch 20. The extension, or contact, 21 is adapted to engage and be frictionally held by a pair of spring loaded jaws which constitute the stationary contact 22 of a disconnect switch. The stationary contact 22 is carried on an insulating support, indicated generally by the reference numeral 23, said insulating support comprising a plurality of porcelain insulators and being secured at its lower end to the framework 1. The mechanism 13, which is pivotally mounted on the insulating support 9, comprises a switchblade for a disconnect switch of which the contact 22 is the stationary contact. From this it will be seen that the series of interrupter switches 20 constitute the movable contact of the disconnect switch. As was mentioned above, the switch blade may consist of a single, pivotally mounted, interrupter switch 20.

From Figure 3 the basic makeup of the air circuit interrupter mechanism may be seen. Figure 3 shows a simplification of a preferred form of the invention. A plurality of interrupter units form the pivotal blade of the disconnect switch, of which the contact 22 is the fixed contact, and each interrupter switch 20 comprises a housing 24 formed of a hollow porcelain insulator having caps or end closures 25. The caps 25 and spacers 26 which lie between each pair of housings 24 constitute a support for a common insulating tube 27 which extends longitudinally through all of the housings 24. Radially inwardly of the tube 27 and in spaced apart relation are a plurality of hollow, stationary arcing contacts 28. Radially inwardly of the stationary contacts 28 there is a common operating rod or tie-rod 29 on which all of the movable arcing contacts 30 are carried in insulatingly spaced relationship. Movement of the common operating rod 29 actuates the movable contacts 30 into or out of engagement, simultaneously, with the stationary contacts 28. In Figure 3, the movable contacts 30 are in engagement with and bridge the stationary contacts so that the interrupter switches are in closed-circuit position.

At the left-hand end of the operating rod 29 (as viewed in Figure 3) there are secured blocks 31 and 32, which define a space 33 between them into which space extends the end of the crank arm 34 which is connected to and rotatable with the shaft 10. When shaft 10 is rotated from the full-line position to the dotted-line position of Figure 3, the operating rod 29 is shifted to open-circuit position. That is to say, the movable contacts 30 are shifted out of bridging relationship with the stationary contacts 28 to a position wherein only insulating material is disposed between said stationary contacts. Since the movable contacts 30 are all connected together in insulating relationship on the operating rod 29, the circuit through the interrupter switches 20 is opened or closed simultaneously at three places in response to movement of the operating rod 29.

When the crank arm 34 is in the dotted line position of Figure 3, further clockwise movement of said crank arm causes it to engage the housing 11 and to pivot said housing and the series of interrupter switches 20 connected thereto—all of which go to make up the switch blade of the disconnect switch—in a clockwise direction on the insulating support 9, thereby opening the disconnect switch by separating the contact or extension 21 from the stationary contact 22.

At opposite ends of the common insulating tube 27, which extends longitudinally through all of the porcelain housings 24 of the interrupter switches 20, there are caps 35. The insulating tube 27 is relatively more resilient than the porcelain housings 24 of the connected and aligned interrupter switches 20, and the tube and its caps are, therefore, adapted to be put in tension, both longitudinally and laterally, in place of putting the relatively non-resilient insulator housings 24 in tension.

It is to be understood that although the porcelain housings 24 are employed in addition to the insulating tube 27, such tube alone, or a plurality of such tubes in concentric relation, could constitute the housing as well as serving to define the arcing chambers of the series of switches. The use of the tube alone is sufficient where lower voltages are employed. It will also be understood that the insulating tube 27 might be made of separate tubes secured together in axial alignment and might be joined together by non-insulating material.

The operating mechanism comprising the shaft 10 and the crank arm 34, together with the two blocks 31 and 32 on the operating rod 29, represent a simplified form of actuating mechanism for the interrupter switches. The preferred actuating mechanism which includes spring motor mechanism, positioned within the housing 11, will be described more fully hereinafter.

Figure 4:
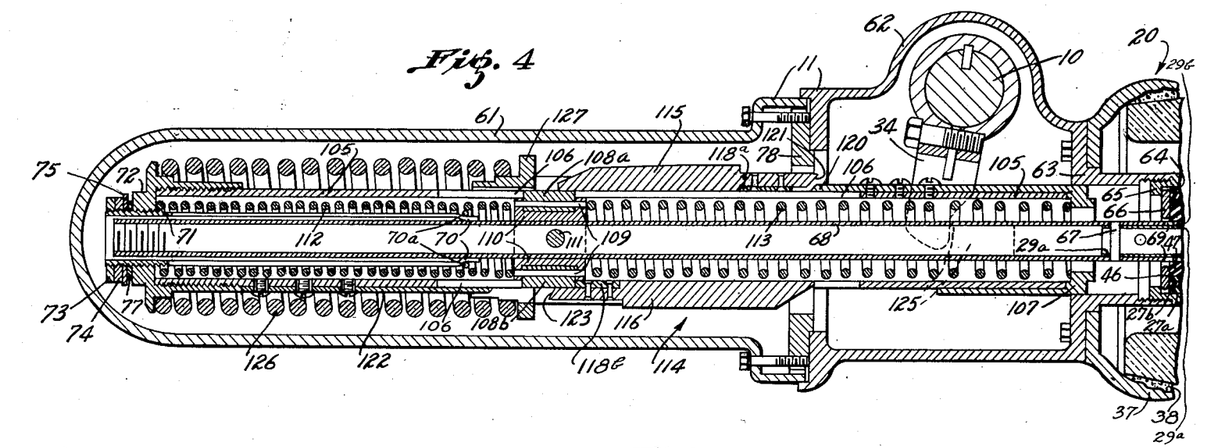
Figure 4, together with Figures 4A and 4B on separate sheets, is a horizontal sectional view, on larger scale, of a single air circuit interrupting mechanism of the type shown in Figures 1 and 2, with the movable contacts of the interrupter switches lying in open-circuit position.
Figure 4A:
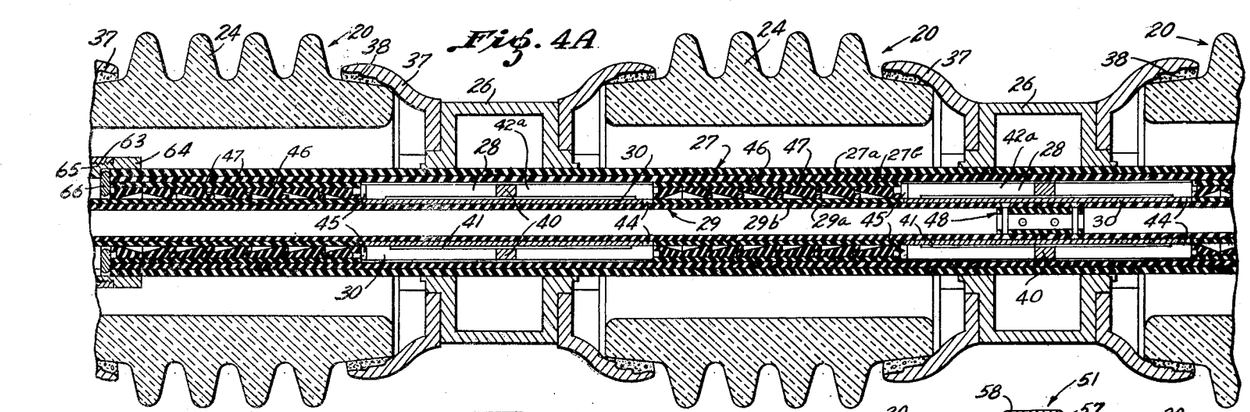
Figure 4B:
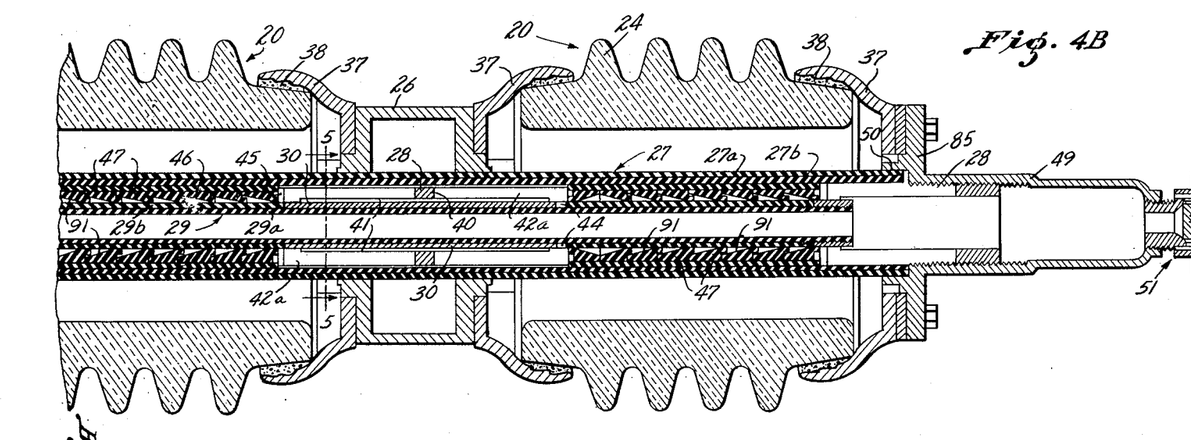
Figures 5, 6:
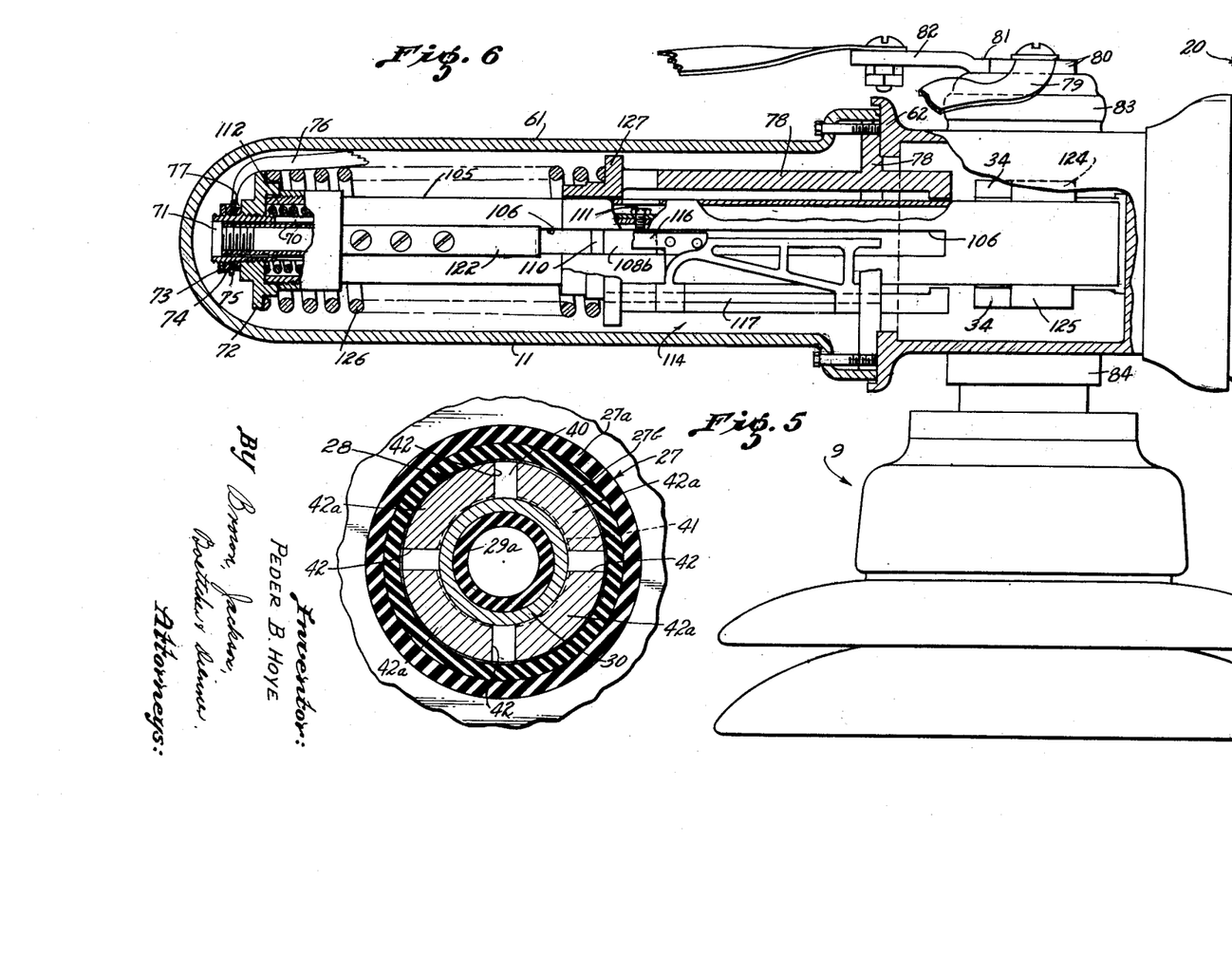
Figure 5 is an enlarged sectional view on the line 5—5 of Figure 4B.
Figure 6, together with Figures 6A and 6B on separate sheets, is a side elevation, partially in section, of the mechanism of Figures 4, 4A and 4B.
Figure 6A:
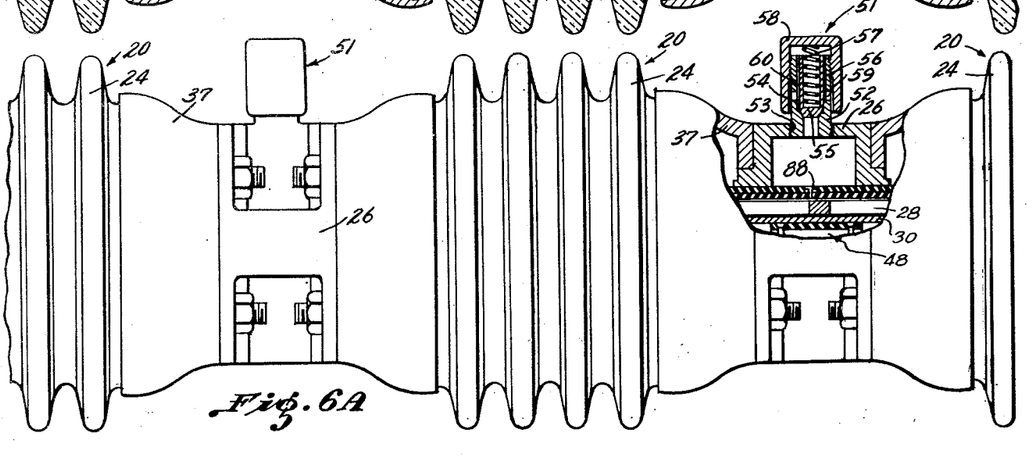
Figures 6B, 8:
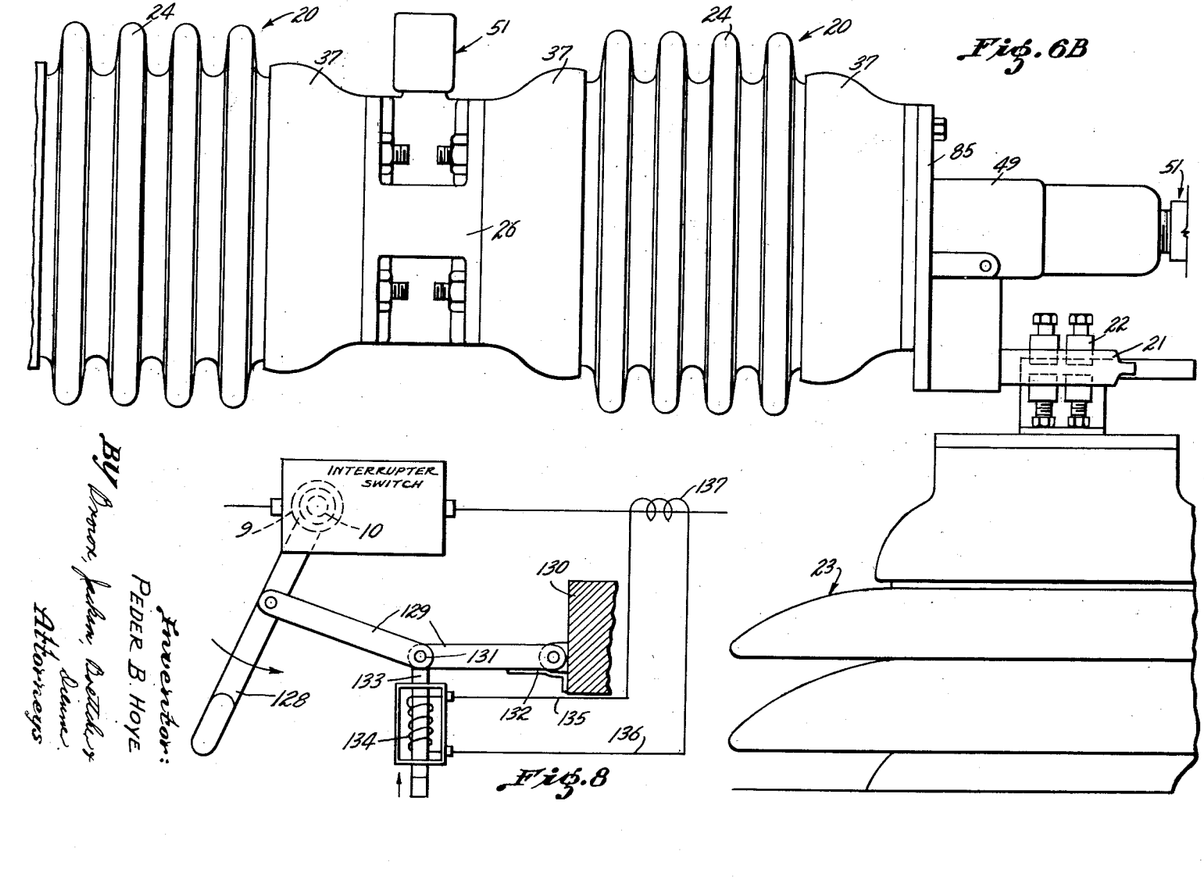

Turning now to Figures 4, 4A, 4B, 5, 6, 6A and 6B, there may be seen a preferred form of the invention on larger scale. It will be seen that Figures 4, 4A and 4B, when aligned, represent the entire switch blade structure of the disconnect switch, which blade comprises a series of interrupter units electrically connected in series. Figures 6, 6A and 6B, when aligned longitudinally are a side elevation of the mechanism shown in Figures 4, 4A and 4B. In the preferred form of the invention, each housing member 24, which comprises a hollow porcelain insulator, has end caps 37 which are cemented to it as shown at 38. Connected to the end caps 37 between adjacent interrupter switches 20 are spacers 26, the spacers 26 and caps 37 being metallic. The most radially inward surfaces of the spacers 26 provide a support for the insulating tube, indicated generally by the reference numeral 27, which tube extends longitudinally through all of the porcelain housings 24 of the interrupter switches 20. In its preferred form the common insulating tube 27 comprises a plurality of concentric tubes, such as the tubes 27a and 27b, tube 27a, for example, being a "bakelite" tube and the inner tube being made of fiber. The material of the fiber tube 27b is such as will release gases when it is heated or burned by an arc resulting when the movable contacts 30 engage or disengage with the stationary contacts 28 of the respective interrupter switches 20. If the voltages impressed on the circuit are below a certain level, the porcelain insulators constituting housings 24 may be dispensed with and the tubes 27a and 27b may constitute the housings for the series of interrupter switches 20.

As may be readily seen from Figures 4B and 5, the latter being an enlarged view, the stationary contacts 28, are slotted lengthwise from either end toward the midportion 40, and the slotted portions are undercut as may be seen at 41 intermediate the ends and the central portion 40. The slots 42 cause the tubular stationary contacts 28 to have four spring fingers 42a which are adapted to engage resiliently with the movable contacts 30 which comprise tubular copper elements having silver tungsten contacts 44. As shown in the drawings, the contacts 44 are disposed at the right-hand end of the tubular contact 30. It will be noted that the left-hand ends of the stationary contacts 28, as viewed in Figure 4B, also have silver tungsten contacts 45. Since the movable contacts are adapted to move into engagement with the stationary contacts to bridge said stationary contacts by a movement toward the right, as viewed in Figure 4B, it is desirable to have the meeting contacts faced with a silver tungsten alloy which resists the high temperature produced by arcing. When the same contacts separate, the silver tungsten surfaces also serve to resist the heat produced by arcing so that the contacts do not melt.

Figure 7:
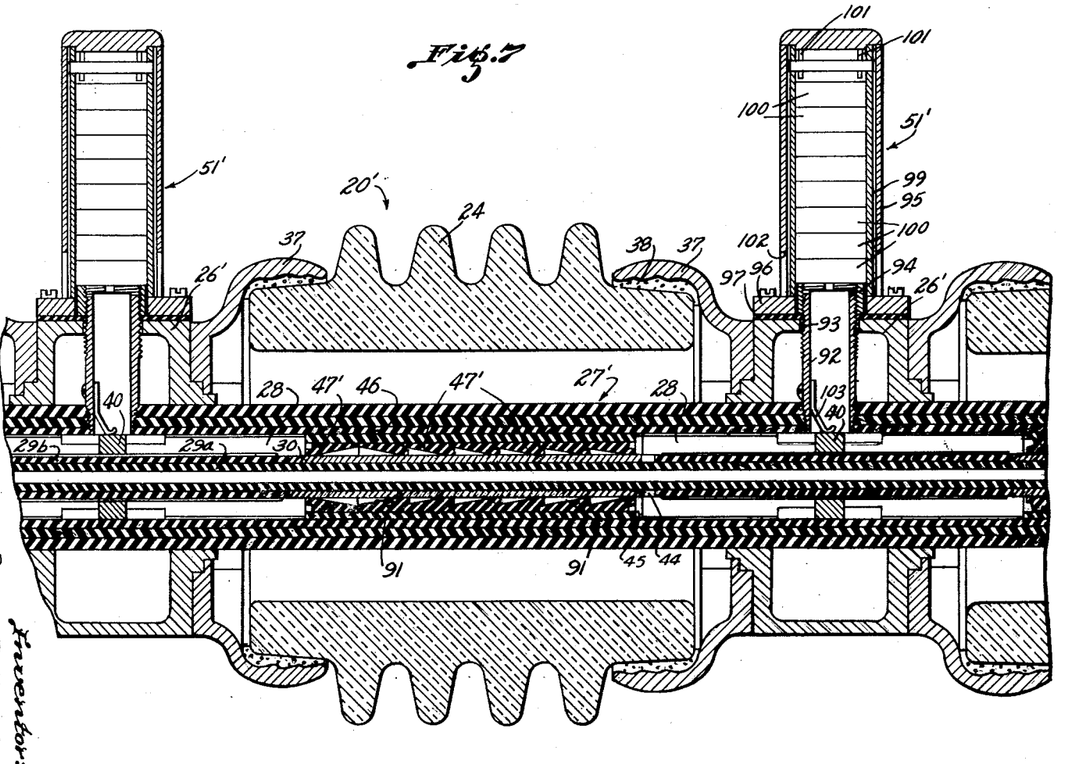
Figure 7 is a fragmentary, vertical, sectional view of a pair of adjacent interrupter switches of modified form and with modified vent means, the movable contacts of the switches being in closed-circuit position.

The stationary contacts 28 are spaced from each other by hollow spacer tubes 46 of fibrous material, and radially inwardly of the spacers 46 are a plurality of fiber rings 47, the shape of which may be more easily seen from Figure 7. As will be explained hereinafter, the arrangement and shape of the rings 47 are such as to cause the gases of combustion resulting from arcing to be directed diagonally into the path of the arc and toward venting means which is provided for each interrupter switch.

The movable contacts 30 are carried on a common operating rod, indicated generally by the reference numeral 29, which operating rod extends through all of the porcelain housings 24 and through the tubes 27a and 27b of the interrupter switches 20. The movable contacts 30 are carried on the outer surface of the tube 29a and are spaced apart by tubular insulating spacers 29b of fibrous material. Movement of the common operating rod or tie-rod 29 causes simultaneous and equal movement of all of the movable contacts 30 as will be readily seen. It will be appreciated that the tie-rod comprising the inner tubular member 29a may be made of several tubular sections connected together as by the junction 48 shown in Figure 4A.

The stationary contact 28 at the right-hand end of Figure 4B is threaded into a hollow cap 49 which is secured to the end cap 37 of the right-hand interrupter switch 20. The cap 49 has a circular flange 50 which also serves as a guide and holder for the insulating tubes 27a and 27b. Into the right-hand end of the cap 49 there is threaded a vent mechanism 51 (shown fragmentarily) which includes a spring loaded pressure relief valve such as is shown in its entirety in Figure 6A. The vent 51 which is connected with the cap 49 is adapted to vent the arcing chamber of the right-hand interrupter unit 20 of Figure 4B. In Figure 6A, the details of the venting mechanism 51 may be seen. A tubular metallic member 52 is threaded into an aperture 53 of the spacer 26 and provides a valve seat 54 against which a valve member 55 is adapted to seat. The valve member 55 has a hollow stem 56 for carrying and guiding the spring 57 which loads the valve member 55 and maintains it upon its seat 54 until the pressure reaches a predetermined level. Threaded onto the upper end of the tubular member 52 is a cap 58. Adjacent its midportion, the tubular member 52 has a plurality of apertures 59 which provide a passageway from the space between the valve stem 56 and the inner surface of the tubular member 52 to outside atmosphere by means of the annular clearance 60 which exists between the inner surface of the cap 58 and the outer surface of the tubular member 52. It will be appreciated that other forms of vent mechanism may be provided, and that such vent mechanisms need not include a pressure relief valve. Another form of venting mechanism will be described hereinafter when reference is made to Figure 7.

Turning now to Figure 4, it will be seen that the housing 11 comprises a removable tubular cap 61 and a generally cubic portion 62. The tubular cap 61 is secured on the left-hand side of the cubic housing 62, and on the right-hand side of said housing 62 is secured, in series, the interrupter switches 20. A tubular flange 63 of the cubic housing 62 is internally threaded to receive a sleeve 64 (see Figure 4 and also Figure 4A) which sleeve has an in-turned flange 65 against which is seated a washer 66 abutting the ends of the common tubular insulating members 27a and 27b, as well as the insulating spacers 46 and rings 47.

As may be seen best in Figure 4, the end of the common tie-rod 29a which is nearest the spring mechanism and shaft 10, is connected by pins 67 to a hollow conductive tubular member 68, which, at its right hand edge, has silver tungsten contact surfaces 69. The tubular member 68 is the movable contact for the adjacent interrupter switch 20 and is one of the plurality of movable contacts which are carried by the common operating tie-rod 29a. At its other end the tubular movable contact 68 has a frictional fit within the spring fingers 70 of a slotted cylindrical member 71 which is threaded into a cap 72 to be described more fully hereinafter. A garter spring 70a encircles the spring fingers 70. Lock nuts 73 and 74 threaded on the sleeve 71 hold the eye 75 of a braided cable 76 (see Figure 6) against a washer 77 which bears against the top surface of the cap 72. Referring now to Figure 6, there will be seen the braided cable 76 (shown fragmentarily) which extends within the cylindrical cap 61 and is adapted to be fastened to a supporting frame 78, which is fastened to the cubic metal housing 62. The latter connection is not shown in the drawings. On the exterior of the cubic housing 62 another braided cable 79 is secured (location not shown in the drawings), which cable extends to an arm 80 of an L-shaped bracket 81 where it is secured. The other arm 82 of the bracket serves as the means for connecting the air circuit interrupting mechanism 13 into the line. The bracket 81 is carried on a cap 83 which contains a roller bearing unit for the cubic housing 62. Beneath the cubic housing 62 there is another roller bearing housing 84, so that the housing 62 and all of the members connected with it, such as the interrupter switches 20, have a free running bearing relative to the insulating support 9 on which the mechanism is all mounted.

From the foregoing it will be seen that the conductive path through the air circuit interrupting mechanism 13 is as follows: From the circuit or line to the L-shaped bracket 81, cable 79, housing 62 and bracket 78, cable 76, lock nuts 73 and 74, sleeve 71 and its spring fingers 70, movable contact 68, and thence through the bridged stationary contacts 28 and movable contacts 30 to the cap 49. The cap 49 has a flange 85 to which is integrally connected the extension 21 (Figures 2 and 6B) which has engagement with the pairs of spring loaded jaws constituting the stationary contact 22 which is carried on the insulating support 23. A bracket (not shown) which is associated with the stationary contact 22 is then connected to the line.

Considering again Figures 4, 4A, 4B, 6, 6A and 6B, it will be seen that as the common tie rod 29a, which carries the movable contacts, is moved longitudinally of itself, either by mechanism such as that illustrated in Figure 3, or by mechanism such as will be described hereinafter, a certain amount of arcing will occur as the movable contacts come into close proximity with the stationary contacts during closing operation of the interrupter switches, or when the movable contacts are being separated from the stationary contacts of the interrupter switches. The fiber rings 47 and fiber insulating spacers 46 and 29b for both the movable contacts and stationary contacts are adapted to give off gases resulting from combustion, which gases help to extinguish the arcing which occurs in the arcing chambers of the interrupter switches, said arcing chambers being defined by the insulator rings, tubular spacers 46 and 29b and adjacent ends of the stationary contacts 28. As may be more clearly seen from Figures 4A and 6A, which are on the same sheet, the gases may flow through the slotted portions of the stationary contact 28 and out of apertures 88 in the concentric pair of insulating tubes 27a and 27b, and into the hollow space within the spacers 26, which are interposed between the interrupter switches 20. From there the gases may escape past the valve 55 and its valve seat 54 and out of the apertures 59 and annular space 60, which latter space is defined by the cap 58 and the outer surface of the tubular metallic member 52 which is threaded into an aperture 53 of the spacer 26. As will be noted from Figures 6A and 6B, each interrupter switch 20 has its own venting means, so that the passage of gases of combustion between adjacent arcing chamber is eliminated. In this way, the arcing across interrupter switches is eliminated.

If reference will now be made to Figure 7, a slightly modified form of interrupter switch 20' will be shown and described. There will also be illustrated and described a different form of venting means for the arcing chamber of such interrupter switch. The interrupter unit 20' which is shown aligned and connected with adjacent interrupter switches, has a porcelain insulator 24 for a housing and metallic end caps 37 which are cemented as at 38 to the housing 24. The end caps are connected to spacers 26' which are interposed between adjacent interrupter switches. The most radially inward surface of the spacers 26' serves as a guide and bearing support for the common insulating tube, indicated generally by the reference numeral 27', which extends through all of the porcelain housings of the associated interrupter switches and assists in defining the arcing chambers of said switches. In the type of interrupter switches shown in Figure 7, the common insulating tube 27' is composed of three concentric insulating members inwardly of which are disposed the tubular stationary contacts 28, which are slotted from their ends toward their midportions 40 and are recessed on their outer surfaces adjacent said midportions 40. Interposed between adjacent stationary contacts 28 are tubular insulating spacers 46 and radially inwardly of said spacers 46 are disposed a plurality of insulating members 47' which are generally ring shaped. As may be seen, the inner surface of each ring 47' lies at an angle with respect to the movable contact 30 and defines a tapered throat 91. The shape of the rings is such that when they are aligned one with the other along their common axis, they cause the gases of combustion to be directed diagonally into the path of any arc which may exist in the arcing chamber. This assists in extinguishing any arc which may be formed and also assists in directing the gases toward the vent for the particular interrupter switch. It will be observed that the left-hand ring 47' in Figure 7 is turned in the opposite direction from that of the other rings. This is done in order to help form a block against the flow of gases toward the left, since the vent for the arcing chamber is through the vent mechanism 51' at the right-hand side of Figure 7. The gases of combustion will, therefore, flow toward the right and between the slots of the stationary contacts 28, and upwardly through a tubular metallic vent pipe 92 which is threaded at its lower end into the three concentric insulating tubes which go to make up the common insulating tube 27. The tube 92 passes through an aperture 93 in the spacer 26' and is locked in position by a nut 94. The housing 95 of the vent mechanism 51' has a base 96 by which it is secured to the spacer 26' with a gasket 97 being interposed to make a tight seal. The housing 95 has a double wall with a space 99 between the walls. Disposed on top of the nut 94 are a plurality of coiled metallic ribbons 100. The coiled ribbons are helically wound and rest one atop another with their coils in non-identical relationship, so that the gases in passing upwardly through them from the vent pipe 92 must pass in and out through the walls defined by the ribbons, so that there is a great deal of surface area to which the heat of the gases may be transferred even before they pass through the slots 101 at the upper end of the inner wall, and to the space 99 between the walls and outwardly through the apertures 102 of the outer wall of the vent housing 95 to the outer atmosphere.

To reduce or eliminate the flow of charging currents through the insulator tubes, spacers and housings of the interrupter switches, there is provided a metallic conductive path from the arcing chamber to the outer atmosphere. This is provided in the device illustrated in Figure 7 by the stationary contact 28, and a spring finger 103 which bears upon the midportion 40 of the stationary contact 28, said spring finger being connected to the inner wall of the tubular vent 92. From there the path continues through the wall of the vent 92 to the nut 94, the helical ribbons 100, and to the housing or cap 95 and base 96, which are associated with the outer atmosphere.

Figure 9:
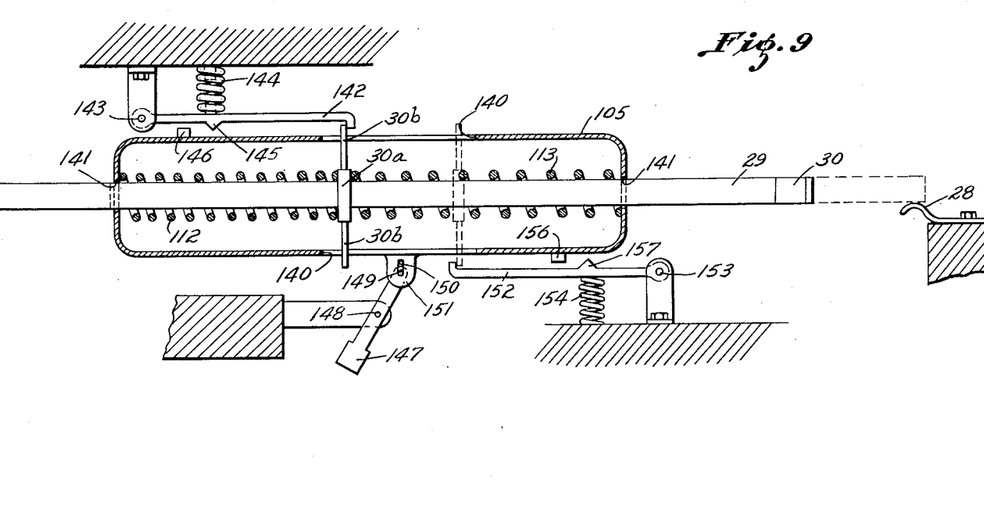
Figure 9 is a diagrammatic showing of a switch mechanism with means for quickly opening and closing the contacts of the switch with a minimum exertion of energy.

Referring now to Figure 9, another for of operating mechanism for the movable contacts of an interrupter switch, or switches, is shown diagrammatically. The operating mechanism provides rapid opening and closing of the circuit and requires a minimum input of energy to provide for such opening and closing. The movable contact 30 is carried on an operating rod 29 which is formed of non-conductive material, and which has a collar 30a. Pins 30b extend upwardly and downwardly from the collar and are adapted to have movement and be guided in a pair of slots 140 in the spring carrier or cage 105. The spring carrier 105 is supported for movement longitudinally of its axis by supporting means (not shown) and the operating rod 29 carrying the movable contact 30 is adapted to be movable longitudinally of its axis and be guided in the apertures 141 at opposite ends of the cage or carrier 105. The upper pin 30b of the collar 30a on operating rod 29 is engaged with a latch 142 which is pivoted at 143 and urged toward the spring carrier 105 by a spring 144. The latch 142 has a cam surface 145 by which the latch may be cammed out of latching engagement with the upper pin 30b when the cam 146, which is secured to the carrier 105, moves against said cam surface 145. The spring carrier 105 and the cam 146 secured on its upper surface may be moved toward the right, as viewed in Figure 9, by an operating crank 147 which is pivoted at 148 and connected by a pin 149, working in a slot 150, with flange 151 which is secured to the spring carrier 105. Movement of the handle or crank arm 147 in a clockwise direction will move the cage 105 to the right. Within the cage 105 are disposed two springs 112 and 113 which are adapted to act against the collar 30a and against opposite ends of the spring carrier or cage 105.

The operating rod 29 is adapted to be latched in open-circuit position, as shown in Figure 9, or in closed-circuit position, as shown by the dotted line position of Figure 9. When the rod is in either position, one of the springs will be compressed for the purpose of actuating the rod toward the other position. Taking spring 112, for example, it will be seen that said spring is already loaded, or biased, and that further movement of the cage 105 to the right by actuating the crank arm 147 will further load or compress the spring 112 so that by the time the cam 146 engages the cam surface 145 to trip the latch there is sufficient energy stored up in the spring 112 to move the operating rod 29 through a relatively long path into its other latched position, and into engagement with the stationary contact 28. From this it will be seen that by a relatively short actuating movement of the cage 105 toward the right, a relatively long movement of the actuating rod 29 and movable contact 30 to the right is provided. That is very desirable, since it reduces the amount of movement which is needed of the actuating mechanism for the movable contact.

When the movable contact 30 is in engagement with the stationary contact 28, after being shifted to the right from its full-line position, the lower pin 30b will engage the latch 152 which is pivoted at 153 and is loaded by the spring 154. Also, the spring 113 will be loaded. At that time, the crank arm 147 may be actuated in a counterclockwise direction further to compress the spring 113 and move the cage 105 to cause the lower cam 156 on said cage to engage the cam surface 157 on the latch 152 and thereby trip the latch so that the spring 113 may move the movable contact 30 to the left until the upper pin 30b of collar 30a engages with the latch 142.

From the foregoing it will be seen that there is a transfer of potential energy from one spring to the operating rod 29 and movable contact 30, in the form of kinetic energy, and then a transfer of the kinetic energy to the other spring in the form of potential energy. The second spring in each instance serving as a retarding spring and reabsorbing the energy which has been given up by the actuating spring, less frictional losses. It is only necessary in such a spring system to compensate for frictional losses arising from movement of the operating rod and the movable contact. To compensate for such frictional losses, the spring which is already loaded within the spring cage is further loaded by the crank 147 before the latch is tripped to permit said spring to move the operating rod and movable contact. The additional energy stored up, together with that already in the compressed, or loaded, spring is sufficient to move the operating rod to its other latched position and to compress the other spring (the retarding spring) and to overcome friction. The retarding spring then becomes the actuating spring for subsequently moving the movable contact in the opposite direction.

While there was illustrated and described in Figures 3 and 9 two forms of operating mechanism for actuating the movable contacts of one or a series of interrupter switches 20, the preferred form of actuating mechanism is that shown in Figures 4 and 6. In Figures 4 and 6 there will be seen motor means comprising spring motors which are adapted to act on the common operating rod or tie rod 29a which carries the movable contacts of the series of interrupter switches. Such spring motor, or motors, are adapted to give rapid movement to the movable contacts in engaging or disengaging them with the stationary contacts in order more quickly to open and close the circuit, and in order to minimize arcing. A spring housing 105 (sometimes referred to as a cage or spring carrier) comprising a tubular member, with its wall slotted at its middle as shown at 106, has a cap 72 at its left end, as viewed in Figures 4 and 6, and a cap 107 secured at its right-hand end. Guided in the slotted portion 106 are a pair of oppositely disposed metal blocks 108a and 108b which are fastened by pins 109 to opposite sides of a carrier 110. The carrier 110 is connected to the tubular conductive member 68, which forms one of the movable contacts, as by a pin 111. A spring 112 is disposed between the carrier 110 and the cap 72, and another spring 113 is disposed on the opposite side of the carrier 110 between it and the cap 107. The springs 112 and 113 are opposed to each other, and when the common operating rod which carries the movable contacts is stationary in either its open-circuit position or its closed circuit position, one or the other of the springs is loaded. To maintain the movable contact in either open circuit position or closed circuit position when one or the other of the springs is so loaded, there is provided latch means, indicated generally by the reference numeral 114, which comprises a pair of latch members 115 and 116 which are disposed on opposite sides of the spring housing 105 and which are spring loaded so that they are constantly urged laterally of their longitudinal axes and against the spring housing 105. The hardened steel blocks 118a and 118b of the latches 115 and 116, respectively, are adapted alternately to be put into latching engagement with the blocks 108a and 108b which are connected with the common operating rod through the intermediary of the tubular movable contact 68 and the pin 111 and block carrier 110.

It will be seen that the common operating rod 29a, including the movable contact 68, is movable through the spring housing or carrier 105, and that the housing or carrier 105 is itself movable, being supported at its right hand end, as viewed in Figure 4, by the tubular flange 63 of the cubic housing 62, and adjacent its other end by a supporting bracket 78, mentioned above, which is secured to the cubic housing 62 (see Figure 6). The supporting bracket also supports the latch members 115 and 116 for pivotal movement on pins, such as the pin 117 of Figure 6. A spring may be coiled around each pin 117 and act between the bracket 78 and the adjacent latch to urge the latch toward the spring housing 105. The steel block 118a of latch 115 is adapted to engage against the block 108a when the movable contacts are in closed-circuit position, and the hard steel block 118b of latch 116 is adapted to engage against the block 108b when the movable contacts are in open-circuit position, as is shown in Figure 4. Latch 116 is adapted to be tripped, and thereby to release the block 108b and the associated elements which are connected with it, such as the movable contacts 68 and 30, so that the contacts may be rapidly engaged with the stationary contacts 28 by means of the spring 112. The spring 112, in so acting, urges the carrier 110 and its blocks 108a and 108b, and the connected movable contacts, sufficiently to the right that the movable contacts 68 and 30 engage and bridge the stationary contacts, and the spring 112 also moves the block 108a past the block 118a on the latch 115, whereupon the latch 115 snaps inwardly to retain the block 108a in that position, which position corresponds to closed circuit position of the pairs of contacts of the interrupter switches 20.

Before the movable contacts may be disengaged from the stationary contacts it is therefore necessary that the latch mechanism 115 be tripped. The manner in which this is done will now be described. The spring carrier or housing 105 carries on its side a tripping bar 120 which is adapted, when the spring housing 105 moves to the left, to engage the cam surface 121 of the latch 115 and to cam it out of engagement with the block 108a, when said block is held by the latch 115. At that time the spring 113 will drive the block carrier 110 and the movable contacts to the left, and the latch 116 will then engage block 108b.

Similarly, latch 116 may be tripped by a latch bar 122 carried on the opposite side and at the opposite end of the spring carrier 105. Movement of the spring carrier 105 to the right, as viewed in Figure 4, causes the tripping bar 122 to engage the cam surface 123 of latch 116 and to cam it sideways and out of engagement with the block 108b. At that time the spring 112 will drive the block carrier 110 and its blocks 108a and 108b, and the movable contacts 68 and 30, and the common operating rod, or tie-rod, 29a, to the right.

The mechanism for operating the spring carrier 105 to cause the tripping of latches 115 and 116 by its tripping bars 120 and 122, respectively, will now be set forth. On the top and bottom of the spring carrier 105, as viewed in Figure 6, there are positioned blocks 124 and 125 which are adapted to be engaged by the crank arms 34, which are connected with the shaft 10, which, in turn, is connected with the rotatable insulating support 9. As may be seen most clearly in Figure 4, counterclockwise rotation of the shaft 10 will cause the crank arms 34 to engage blocks 124 and 125 and thereby urge the spring carrier 105 to the right. Such movement to the right will bring the tripping bar 122 of the spring carrier 105 into engagement with the cam surface 123 of the latch 116 and cause it to move away from the block 108b. While the spring housing 105 moves to the right to trip the latch 116, the housing or cage 105 also further compresses the spring 112 which is already loaded. Then the spring 112 will drive the blocks 108a and 108b to the right until the movable contacts connected therewith are engaged with the stationary contacts of the interrupter switches and until the block 108a is caught by the block 118a of latch 115.

Since there will be certain frictional losses in transferring the blocks 108a and 108b from one latch to another, it is necessary to compensate for such frictional losses. This compensation is provided by initially having spring 112 pre-stressed and then further loading it through the spring carrier or cage 105 as the cage is moved to the position in which it trips the latch 116. Means for compensating for such frictional losses in the mechanism of Figures 4 and 6, when the movable contacts are to be moved from closed-circuit position to open circuit position, is provided by a stronger spring 126 which is interposed between a shoulder of the cap 72 of spring carrier 105 and a shoulder on the flange 127 of the bracket 78, said bracket 78 being connected to the cubic housing 62. It will be seen that as the crank arms 34 rotate in a counterclockwise direction, and the spring housing 105 is moved to the right, not only is the spring 112 compressed, but also the larger spring 126. Consequently, energy is stored up in the spring 126 as the housing 105 moves to the right.

In order to keep the spring 126 from immediately returning the spring housing 105 to the left and thereby tripping the latch 115 and causing the movable contacts to be moved to open circuit position, latching means is disposed at the lower end of the rotatable insulating support 9 which is connected to the shaft 10. A diagrammatic showing of one form of such latching means is shown in Figure 8, to which reference should now be made. It will be appreciated that the showing in Figure 8 is diagrammatic and that various forms of latching means could be used. Shaft 10 which extends into the housing 62 for the spring mechanism of the interrupter switches 20 is connected to the rotatable insulating support 9 which extends downwardly to a crank arm 128. A toggle 129 is connected between the crank arm 128 and a fixed support 130. The crank arm 128 tends to rotate in a counterclockwise direction by reason of a spring, such as the spring 126 of Figures 4 and 6, and tends to cause the toggle joint 131 to move downwardly. Such downward movement is prevented by the stop 132 which is connected to the fixed support 130. Upward movement of the toggle 129, which will cause the toggle to collapse and permit the handle 128 to move in a counterclockwise direction (which movement corresponds to a clockwise movement of the arms 34 and shaft 10 in Figure 4) may be caused by upward movement of the armature 133 of a solenoid 134 which is responsive to a fault in the circuit. The solenoid 134 is connected by conductors 135 and 136 to a coil 137 encircling the main line of the circuit and, when, for example, the circuit is overloaded, the solenoid 134 will be energized and draw the armature 133 upwardly and cause the toggle to be collapsed. Such collapse would allow the shaft 10 and crank arms 34 of Figure 4 to move in a clockwise direction under the compulsion of the spring 126, which also urges the spring housing 105 toward the left. Movement of the spring housing to the left as viewed in Figure 4, under the compulsion of the larger spring 126 will further compress the spring 113 so that when the housing 105 has moved sufficiently that the tripping bar 120 trips the latch 115 and releases block 108a, the spring 113 will very rapidly move the block and connected movable contacts 68 and 30 out of engagement with the stationary contacts 28 of all of the interrupter switches and thereby rapidly open the circuit in response to the fault. The movable contacts will then move to, and become latched in, open-circuit position, since the spring 113 will urge the block carrier 110 and its blocks 108a and 108b to a position wherein the block 108b will be latched by the latch 116.

To there after return the movable contacts into engagement with the stationary contacts it will be necessary for the shaft 10 and crank arms 34 to be moved in a counterclockwise direction and against the blocks 124 and 125 on the spring housing 105, as viewed in Figure 4, to urge the spring housing 105, in opposition to the action of spring 126, to the right, to cause a tripping of the latch 116 and to set up the latch means, such as the latch means illustrated in Figure 8. Thereupon spring 112 will rapidly cause the movable contacts to engage and bridge the stationary contacts of the series of interrupter switches, thereby closing the circuit again. If a fault still exists in the circuit, the circuit will be immediately interrupted again in the manner just described.

From the foregoing it will be readily apparent that the spring means for actuating the movable contacts of the interrupter switches is adapted to transfer its potential energy to the movable contacts in the form of kinetic energy. The movable contacts in so moving transfer the kinetic energy back into the springs means in the form of potential energy. As as result, very little energy need be added—only enough to overcome frictional losses.

Automatic means of known types for reclosing the circuit immediately upon its being opened by the interrupter switch, or series of interrupter switches, may be employed and it is therefore very important that the means for moving the movable contacts rapidly not require complicated mechanism or mechanism which exhausts its energy upon a single opening or closing movement or combination of one closing plus one opening movement.

It will be apparent from Figure 4 that when the circuit is interrupted in response to a fault in the circuit, or in response to manual operation of the rotatable insulating support 9 and shaft 10, the disconnect switch may also be opened by further clockwise movement of the crank arms 34 into engagement with the wall of the housing 62, since such movement will then cause the housing 62 and connected interrupter switches and contact 21 all to pivot out of engagement with the stationary contact 22 of the disconnect switch. From this it will be apparent that the operating mechanism for actuating the interrupter switches and the disconnect switch is a common operating means which includes the rotatable insulating support 9 which carries the interrupter switches 20.

If, after the disconnect switch and interrupter switches are both opened, it is desired to reclose the circuit, counter clockwise movement of the rotatable insulating support 9 and its shaft 10 will cause the crank arms 34 connected to shaft 10 to engage the blocks 124 and 125, of the spring carrier 105. Since the housing 62 and the connected interrupter switches 20 have a ball bearing mounting with respect to the insulating support 9, and since the larger spring 126 resists movement of the spring housing 105 to the right, the first reaction to engagement of the crank arms 34 upon the blocks 124 and 125 will be to rotate the housing 62 and associated interrupter switches 20 in a counterclockwise direction, as viewed in Figure 4, to cause the disconnect switch to be closed first. After the disconnect switch is closed, the housing 62 and the interrupter switches can no longer pivot in a counterclockwise direction, and consequently further rotation of the shaft 10 will cause the crank arms 34 to push the blocks 124 and 125 and to move the spring housing 105 to the right, even though such movement is opposed by the spring 126. After a predetermined movement of the housing 105, the tripping bar 122 will trip the latch 116, whereupon the spring 112 will cause the carrier 110 for the blocks 108a and 108b to move to the right and engage the movable contacts 68 and 30 with their respective stationary contacts 28 of the interrupter switches. At that time the air circuit interrupter mechanism will be in closed circuit position in its entirety.

It will be observed from the preferred form of the invention that the interrupter switch, or switches, have their movable contacts actuated in response to movement of a rotatable insulating support. Such support may constitute a stack of porcelain insulators, together with elements for connecting them together, all of which, taken together, provides a rather large mass. Such a stack of insulators cannot have an excessive torque applied to it for fear of breakage. It should also be kept in mind that the movable contact, or contacts, of the interrupter switch, or switches, must be rapidly moved into and out of engagement. The actuating mechanism for loading the spring motor means and for tripping the latch means may, therefore, in putting in the desired amount of energy in a given time, either move against a "fifty pound" spring through a longer path, or against a "one-hundred pound" spring through a shorter distance. For example, referring to Figures 4 and 6, the crank arms 34 could move the cage 105 through a two inch path against fifty pounds of force provided by the spring 112 or one inch against one hundred pounds of force provided by a "stiffer" spring 112. Since it is desired to load the spring 112 and to trip the latch within a given time, the actuating mechanism would need to move twice as fast through a two inch path as through a one inch path. Since the actuating means includes not only the crank arms 34, but the stack of insulators 9, which have a large mass, it is desirable to reduce the velocity of the actuating mechanism, such as the stack of insulators 9, since the energy to be expended in rotating the stack of insulators to actuate the crank arms 34 and to compress spring 112 and trip the latch, increases with the square of the velocity of the rotatable stack of insulators. It will be seen that much less energy need be expended if there is a short movement of the spring carrier to compress the spring 112. The energy which would be put into the stack of insulators in moving the stack faster to move the crank arms 34 through a longer path would largely be lost, since the energy put into the stack cannot be put to effective use after the stack has actuated the spring carrier 105 to tripping position.

In order to employ a short actuating movement, which as shown above is more desirable, and yet obtain a relatively longer movement of the movable contact, I preload, or pre-compress or bias, the spring which will actuate the movable contacts when said contacts are latched in one position, and then further load said spring before releasing the latch means to permit the spring to move the movable contacts. This permits a short actuating movement which results in relatively longer movement of the movable contact and also reduces the amount of energy which must be put into the actuating mechanism, which includes the stack of insulators. While the actuating movement for further loading of the spring and tripping of the latch is shown to be an arcuate movement in Figures 4 and 6, it will be appreciated that a straight-line movement would also provide satisfactory operation.

It should be observed from Figures 4 and 6 that the larger spring 126 is adapted to perform the following four functions:

1. By being interposed between the crank arms 34 of crank 10 and the housing for the pivotally mounted switch blade of the disconnect switch, it prevents opening of the disconnect switch when the movable contacts of the interrupter switches move from closed circuit position to open-circuit position.

2. If the blade (i. e. the interrupter switch or series of interrupter switches) of the disconnect switch is mounted vertically, the spring 126 prevents movement of the spring housing 105 to its tripping position in response solely to the action of gravity.

3. It accelerates the turning moment on shaft 10, through spring housing 105, blocks 124 and 125 and crank arms 34, when the movable contacts are in closed-circuit position and the latching means holding the shaft 10 is released.

4. It acts as an additional means for storing potential energy for use in rapid actuation of the movable contacts of the interrupter switches.

Although I have shown preferred embodiments of my invention, I do not intend to be limited thereto, except in so far as the appended claims are so limited, since those skilled in the art, when having my disclosure before them, will be able readily to devise modifications and changes which do not depart from the true scope of the invention.

I claim:

1. In an air circuit interrupter, in combination, an interrupter switch and a disconnect switch in series, said switches each comprising a stationary contact and a movable contact with the stationary contact of the interrupter switch serving as the movable contact of the disconnect switch, a stationary insulating support for supporting the stationary contact of the disconnecting switch, a rotatable insulating support comprising the sole support of said interrupter switch, said rotatable insulating support comprising common operating mechanism for operating mechanism for operating both switches, said rotatable insulating support being adapted in one position to actuate the interrupter switch and in another position to actuate the disconnect switch, and spring means adapted to accelerate movement of said rotatable insulating support toward its second position when the movable contact of the interrupter switch is moved away from its stationary contact.

2. The combination of claim 1 wherein the movable contact of the interrupter switch is mounted for movement in a vertical path and said spring means additionally serves to counteract the effect of gravity on the movable contact of the interrupter switch.

3. In an air circuit interrupter, a plurality of interrupter switches in series, each of said switches including a stationary arcing contact and a movable arcing contact, said movable contacts being insulatingly interconnected and movable simultaneously with respect to their respective stationary contacts, an arcing chamber for each switch with each movable arcing contact being adapted to move through an arcing chamber, and a plurality of tapered throats in each chamber adapted to direct the gases of combustion diagonally into the path of an arc which may be formed.

4. The combination of claim 3 wherein the movable contacts lie on a common axis.

5. The combination of claim 3 wherein the movable contacts lie on a common axis and have rectilinear movement along said axis.

6. In an air circuit interrupter, a plurality of interrupter switches in series, each of said switches including a stationary arcing contact and a movable arcing contact, an arcing chamber for each switch with each movable arcing contact being adapted to move through an arcing chamber, said movable contacts being insulatingly interconnected and movable simultaneously with respect to their stationary contacts, a separate vent for each switch for exhausting gases resulting from arcing so as to eliminate the passage of gases from the chamber of one interrupter switch to the chamber of an adjacent interrupter switch.

7. The combination of claim 6 wherein the vent is adjacent an end of each interrupter switch and means is provided within the arcing chamber of each interrupter switch adapted to direct the gases resulting from arcing toward its respective vent.

8. In an air circuit interrupter, a plurality of interrupter switches in series, each switch having a hollow housing, a tubular insulating member extending through all of said housings and defining a separate arcing chamber in each housing for each switch, said arcing chambers being closed off from each other, a pair of relatively movable tubular arcing contacts in each chamber, and a common actuating member extending through said insulating member and said contacts for effecting relative movement between the contacts of each pair.

9. In an air circuit interrupter, a plurality of interrupter switches in series, each switch having a hollow housing, a hollow insulating member extending through all of said housings and defining a separate arcing chamber in each housing for each switch, said arcing chambers being closed off from each other, and a pair of relatively movable arcing contacts in each chamber, each pair of relatively movable arcing contacts comprising a stationary contact and a movable contact with each movable arcing contact being adapted to move through its separate arcing chamber, said movable contacts being insulatingly connected together and adapted simultaneously to open or close the respective interrupter switches.

10. In an air circuit interrupter, a plurality of interrupter switches in series extending along a common axis, a hollow insulating member extending the length of all of said switches and defining a separate arcing chamber for the arcing contacts of each switch, said arcing chambers being closed off from each other, vent means for each chamber, and a plurality of throats constructed and arranged to direct gases resulting from arcing diagonally into the path of the arc towards the vents for the respective arcing chambers.

11. In an air circuit interrupter, a plurality of interrupter switches in series, each switch having a hollow housing, a spacer unit between adjacent switches, a hollow insulating member extending through all of said housings and spacer units and defining a separate arcing chamber in each housing for each switch, said arcing chambers being closed off from each other, a pair of relatively movable arcing contacts in each chamber, a common actuating member extending through said hollow insulating member for effecting relative movement between the contacts of each pair, and a vent mechanism passing through each spacer and said hollow insulating member to provide a portion of the path for the flow from the arcing chamber of gases resulting from arcing.

12. In an air circuit interrupter, a plurality of interrupter switches in series, each switch having a hollow housing, a hollow spacer unit between adjacent switches, a hollowk insulating member extending through all of said housings and defining a separate arcing chamber in each housing for each switch, said arcing chambers being closed off from each other, a pair of relatively movable arcing contacts in each chamber, a common actuating member extending through said hollow insulating member for effecting relative movement between the contacts of each pair, a vent connected to and through the wall of each spacer, apertures through said hollow insulating member in said spacers in alignment with said vents, and a pressure responsive relief valve in each vent for venting from the arcing chamber the gases resulting from arcing.

13. In an air circuit interrupter, a pair of interrupter switches in series, each switch having a hollow housing, a hollow insulating member extending through both of said housings and defining a separate arcing chamber in each housing for each switch, said arcing chambers being closed off from each other, a stationary arcing contact and a movable arcing contact in each chamber, one of said contacts extending between the chambers of the adjacent switches, said stationary contacts being hollow and slotted at one end, said slotted portions providing spring fingers on the stationary contacts and a path for gaseous products of combustion, said movable contacts being disposed radially inwardly of the stationary contacts and adapted to have movement longitudinally of the hollow stationary contacts into and out of engagement therewith, and a common actuating member extending through said hollow insulating member and said stationary contacts for actuating said movable contacts.

14. The combination of claim 13 together with spacer units between adjacent switches and a vent for each switch, said vents passing through the spacer units and providing, along with the slots in the stationary contacts, a path for the flow from the arcing chamber to a point outside of the switches of gases resulting from arcing.

15. In an air circuit interrupter, a plurality of interrupter switches in series disposed along a common axis, each switch having a hollow housing, a hollow insulating member extending through all of said housings and defining a separate arcing chamber in each housing, a stationary racing contact and a movable arcing contact in each arcing chamber, said movable contacts being insulatingly carried on a common rod for simultaneous movement, said hollow insulating member and stationary contacts being disposed radially outwardly of said movable contacts and being removable as a unit from the series of interrupter switches by movement out of said hollow housings along a line parallel to said common axis.

16. In an air circuit interrupter, a plurality of interrupter switches in series, each switch having a hollow insulator as a housing with the housings being interconnected along a common axis, a hollow insulating tube extending through all of said housings and helping to define a separate arcing chamber in each switch, and a pair of relatively movable arcing contacts for each switch with each movable arcing contact being adapted to move through its separate arcing chamber, said hollow tube being relatively more resilient than the interconnected housings and being adapted to be put under tension by gases resulting from arcing instead of putting the housing under tension.

17. In an air circuit interrupter, a plurality of interrupter switches in series, each switch having a hollow insulator as a housing with the housing being interconnected along a common axis, a hollow insulating tube extending through all of said housings and helping to define an arcing chamber in each switch, a stationary contact and a movable contact for each switch inside said tube, apertured caps connected to each end of the hollow insulating tube, said movable contacts being secured to a common operating rod which is adapted to slide in said apertured caps for moving said movable contacts into and out of engagement with the stationary contacts, said tube and caps being adapted to be put under tension by gases resulting from arcing instead of putting the hollow housings under tension thereby.

18. Air circuit interrupter mechanism comprising a disconnect switch having a stationary contact and a pivotally movable blade, said blade comprising an interrupter switch having a stationary contact and a movable contact adapted to be in series with the stationary contact of the disconnect switch, a support for said pivotally movable blade, said support being adapted to actuate the movable contact of the interrupter switch, and spring means disposed between said blade and said support, said spring means being adapted to accelerate the movable contact of the interrupter switch from closed-circuit to open-circuit position and also being adapted to resist movement of the switch blade when the movable contact of the interrupter switch moves away from its stationary contact.

19. In an interrupter switch, in combination, a housing, a movable arcing contact and a stationary arcing contact in the housing, means for actuating the movable contact, said means comprising spring means adapted rapidly to move said movable contact into engagement with the stationary contact, second spring means adapted rapidly to move said movable contact out of engagement with said stationary contact, means for loading both of said spring means separately, said loading means, after a predetermined movement in one direction during which the first spring is loaded, releasing the loaded first spring means, and said loading means, after a predetermined movement in another direction during which the second spring is loaded, releasing said second spring means.

20. The combination of claim 19 wherein the interrupter switch is pivotally mounted and its stationary contact is adapted to form the movable contact of a disconnect switch, together with a counter-balancing spring acting between the housing of the interrupter unit and the loading means for resisting opening movement of the disconnect switch during opening of the interrupter switch.

21. In an interrupter switch, in combination, a housing, a movable arcing contact and a stationary arcing contact in the housing, means for actuating the movable contact, said means comprising spring means adapted rapidly to move said movable contact into engagement with the stationary contact, second spring means adapted rapidly to move said movable contact out of engagement with said stationary contact, a carrier for said springs, latch means adapted to hold the movable contact in open-circuit position, and second latch means adapted to hold the movable contact in closed-circuit poisition, said two latch means being separately tripped by the carrier, one of said latch means being tripped by movement of the carrier in one direction and the other latch means being tripped by movement of the carrier in the opposite direction, the movement of the carrier in either direction first loading the spring means and then suddenly releasing it by tripping of the corresponding latch means so that rapid making and breaking of the circuit is made possible.

22. The combination of claim 21 together with third spring means, said third spring means being disposed between the housing of the interrupter switch and the spring carrier and being adapted to resist movement of said spring carrier in a direction which causes loading of said first named spring means, and means for moving the spring carrier in a direction to cause loading of the first named spring means and tripping of the latch means.

23. The combination of claim 22 wherein the means for loading the spring carrier comprises an insulating support for the interrupter switch.

24. The combination of claim 22 wherein all of the springs and the movable contact lie on a common axis.

25. The combination of claim 22 wherein all of the springs and the movable contact lie on a common axis and the third spring is disposed about one of the first two named springs.

26. In an interrupter switch, in combination, a housing, a stationary arcing contact and a movable arcing contact in said housing, spring means adapted rapidly to move said movable contact into engagement with said stationary contact, second spring means, the latter spring means being adapted rapidly to move the movable contact out of engagement with said stationary contact, a spring carrier for said springs adapted when moved to load one spring and unload the other, latch means adapted to hold the movable contact in open-circuit position with the first spring means under load, a second latch means, said second latch means being adapted to hold the movable contact in closed-circuit position with the second spring means under load, latch tripping means on the spring carrier adapted to trip the first latch means upon a predetermined movement of said carrier in one direction and adapted to trip the second latch means upon a predetermined movement of said carrier in the opposite direction, a third spring means acting between the housing of the switch and the spring carrier and adapted to resist movement of the carrier in the direction which will cause engagement of the movable contact with the stationary contact, actuating means for the spring carrier adapted to move it in a direction which will first load the first named spring means and said third spring means and then trip the latch to permit the first named spring means to move the movable contact into engagement with the stationary contact, latch means for said actuating means adapted to hold the actuating means against movement in the opposite direction, said first mentioned movement of the actuating means sufficiently loading the third named spring means that, when the latch means for the actuating means is released, the carrier is adapted to be moved in a direction to load the second named spring means and to release said second latch means whereby the second named spring means will rapidly move the movable contact out of engagement with the stationary contact.

27. The combination of claim 26 wherein the stationary contact of the interrupter switch is adapted to form a movable contact of a disconnect switch and the actuating means for the spring carrier is adapted to actuate the fixed contact of the interrupter switch out of engagement with the stationary contact of the disconnect switch, said third spring means serving also to provide a turning moment for accelerating the movement of said actuating means in causing opening of the disconnect switch.

28. In air circuit interrupting mechanism, in combination, a disconnect switch having a stationary contact and a pivotally mounted switch blade, said blade comprising a plurality of interrupter units in series with each other and with said stationary contact, each of said interrupter units having a stationary contact and a movable contact, common operating means for all of said movable contacts to operate them simultaneously, said common operating means comprising a common support for all of said movable contacts, said common support having a closed-circuit position and an open-circuit position, latch means for holding the common support in one or the other of said positions, motor means adapted to release the latch means and actuate the common support to move it rapidly to closed-circuit position or to open-circuit position, means adapted to energize said motor means to cause the latter to release the latch means and move the common support to closed-circuit position, the energy input in such actuation being such as to enable the motor means subsequently to release the latch means and move the common support to open-circuit position in response to a fault in the circuit, and spring means disposed between the switch blade and the motor means and serving to restrain movement of the switch blade out of engagement with the stationary contact of the disconnect switch during movement of the common support to open-circuit position.

29. In air circuit interrupting mechanism, in combination, a disconnect switch having a stationary contact and a pivotally mounted switch blade, said blade comprising a plurality of interrupter units in series with each other and with said stationary contact, each of said interrupter units having a stationary contact and a movable contact, common operating means for all of said movable contacts to operate them simultaneously, said common operating means comprising a common support for all of said movable contacts, said common support having a closed-circuit position and an open-circuit position, latch means for holding the common support in one or the other of said positions, motor means adapted to release the latch means and actuate the common support to move it rapidly to closed-circuit position or to open-circuit position, and means adapted to energize said motor means to cause the latter to release the latch means and move the common support to closed-circuit position, the energy input in such actuation being such as to enable the motor means subsequently to release the latch means and move the common support to open-circuit position in response to a fault in the circuit, said energizing means including a rotatable insulating support for the pivotally mounted switch blade and said insulating support being adapted upon predetermined movement to actuate the switch blade to pivot it out of engagement with the stationary contact of the disconnect switch.

30. In air circuit interrupting mechanism, in combination, a disconnect switch having a stationary contact and a pivotally mounted switch blade, said blade comprising a plurality of interrupter units in series with each other and with said stationary contact, each of said interrupter units having a stationary contact and a movable contact, common operating means for all of said movable contacts to operate them simultaneously, said common operating means comprising a common support for all of said movable contacts, said common support having a closed-circuit position and an open-circuit position, latch means for holding the common support in one or the other of said positions, motor means adapted to release the latch means and actuate the common support to move it rapidly to closed-circuit position or to open-circuit position, means adapted to energize said motor means to cause the latter to release the latch means and move the common support to closed-circuit position, the energy input in such actuation being such as to enable the motor means subsequently to release the latch means and move the common support to open-circuit position in response to a fault in the circuit, said energizing means including a rotatable insulating support for the pivotally mounted switch blade and said insulating support being adapted upon predetermined movement to actuate the switch blade to pivot it out of engagement with the stationary contact of the disconnect switch, and means adapted to accelerate said predetermined movement of said rotatable support when the motor means acts to move the common support to open-circuit position.

31. In air circuit interrupting mechanism, in combination, a disconnect switch having a stationary contact and a pivotally mounted switch blade, said blade comprising a plurality of interrupter units in series with each other and with said stationary contact, each of said interrupter units having a stationary contact with a movable contact, common operating means for all of said movable contacts to operate them simultaneously, said common operating means comprising a common support for all of said movable contacts, said common support having a closed-circuit position and an open-circuit position, latch means for holding the common support in one or the other of said positions, motor means adapted to release the latch means and actuate the common support to move it rapidly to closed-circuit position or to open-circuit position, means adapted to energize said motor means to cause the latter to release the latch means and move the common support to closed-circuit position, the energy input in such actuation being such as to enable the motor means subsequently to release the latch means and move the common support to open-circuit position in response to a fault in the circuit, latch means for the energizing means, and means responsive to a fault in the circuit for releasing the last-mentioned latch means, said last-mentioned latch means being adapted upon movement of the energizing means to a predetermined position to hold said energizing means against reverse movement until said latch means is released by the fault responsive means.

32. In a switch, in combination, a pair of relatively movable contacts adapted to be engaged and disengaged to close or open, respectively, an electrical circuit, spring means adapted to move one contact into and out of contact with the other contact, latch means adapted to hold said one contact in its open-circuit position and in its closed-circuit position, means for loading the spring means and then tripping the latch means, whereupon said one contact is moved from one of said positions into the other position and latched therein, said spring means in moving said one contact to said other latched position transferring potential energy to said one contact in the form of kinetic energy and said one contact thereafter transferring kinetic energy back to the spring means in the form of potential energy.

33. The combination of claim 32 together with second means for loading the spring means and tripping the latch means to permit said spring means to move said one contact back to said one of said positions and to latch it therein.

34. The combination of claim 33 wherein both of the means for loading the spring means and tripping the the means to move said one contact in either direction comprise crank means.

35. The combination of claim 33 wherein the means for loading the spring means and tripping the latch means to move said one contact from one of said positions to the other position comprises crank means, and the second means for loading the spring means and tripping the latch means to move said one contact from said other position to said one of said positions comprises a spring which is energized by said crank means when said crank means loads said spring means.

36. In an air circuit interrupting mechanism, in combination, a disconnect switch comprising a stationary contact and a pivotally supported switch blade, said switch blade comprising an interrupter switch having a movable contact and a stationary contact in series with the stationary contact of the disconnect switch, an insulating support for the switch blade, said support being rotatable and drivingly engageable with said switches to actuate at least one of said switches, means connected to the lower end of said rotatable support for exerting a turning moment thereon, and spring means interposed between said movable contact of the interrupter switch and the upper end of said rotatable support by which a complementary turning moment may be exerted at the upper end of said rotatable support.

37. In an interrupter switch, in combination, a tubular insulating member defining an arcing chamber, a tubular arcing contact stationarily mounted in said arcing chamber in said tubular insulating member, a movable contact mounted in said chamber for movement longitudinally of said insulating member and said tubular contact within the interior thereof, an operating member for said movable contact and reciprocable through said tubular arcing contact, vent means between the interior of said chamber and outside atmosphere including a metallic tubular member extending through the wall of said tubular insulating member and leading to the outer surface of said switch, and metallic conductive means electrically connected between said tubular stationary contact and said metallic tubular member.

38. In an interrupter switch, in combination, a tubular insulating member defining arcing chambers, a generally tubular arcing contact stationarily mounted in between a pair of adjacent arcing chambers in said tubular insulating member, a movable contact mounted in said chamber for movement longitudinally of said insulating member and said tubular stationary contact within the interior thereof, vent means between the interior of said chamber and outside atmosphere including a metallic tubular member extending through the wall of said tubular insulating member and leading to the outer surface of said switch between said chambers, said tubular stationary contact being slotted longitudinally thereof at both ends to define vent passages between each of said adjacent chambers and said metallic tubular member, and a metallic conductive spring finger electrically connected to said metallic tubular member and having electrically conductive pressure contact with the unslotted tubular portion of said stationary contact.

39. In a switch, in combination, a pair of relatively movable contacts, one of said contacts being movable through a relatively long path into engagement with the other contact, and actuating mechanism movable through a relatively short path to move said one contact through its relatively long path, said mechanism including a movable member, latch means for holding said one contact in one position, spring means interposed between said one contact and said movable member, said spring means being initially compressed when said one contact is in said one position, and said movable member being adapted further to compress said spring means and then to trip said latch means by said member's movement through said relatively short path, whereby said one contact is rapidly moved by said spring means through said relatively long path and into engagement with said other contact.

40. The combination of claim 39 wherein said movable member of said actuating mechanism comprises a crank, said relatively short path is arcuate, and said relatively long path is straight-line.

41. In an air circuit interrupter, in combination, a plurality of interrupter switches in series, each switch having a pair of relatively movable arcing contacts with each pair of arcing contacts comprising an inner contact and a hollow outer contact, the inner contact being adapted to engage the inside surface of the hollow outer contact, said inner contacts lying along a common line and being separated by insulation having the same outline as the outer surface of the inner contacts, and said hollow outer contacts lying along the same common line and being separated by insulation the radially innermost surface of which has substantially the same outline as the inner surface of said hollow outer contacts.

42. The combination of claim 41 wherein the inner contacts are carried by a common operating rod for simultaneous movement and in their closed circuit position each inner contact bridges adjacent outer contacts and in their open-circuit position each inner contact lies radially inwardly of a hollow outer contact.

43. In an air circuit interrupter, in combination, an interrupter switch and a disconnect switch in series, said switches each having a stationary contact and a movable contact, a first stationary insulating support for supporting the stationary contact of said disconnect switch, the movable contact of said disconnect switch comprising a blade movable with respect to said stationary contact, and a second insulating support constituting the sole support for rotatably supporting said blade, said blade comprising the interrupter switch, the movable contact of said interrupter switch being mounted for reciprocation longitudinally of said blade into and out of engagement with its stationary contact, said second insulating support being rotatable and being operatively associated with the movable contact of said interrupter switch and with said blade for actuating the same.

44. In an air circuit interrupter, in combination, an interrupter switch and a disconnect switch in series, said switches each having a stationary contact and a movable contact, a first stationary insulating support for supporting the stationary contact of said disconnect switch, the movable contact of said disconnect switch comprising a blade movable with respect to said stationary contact, and a second insulating support constituting the sole support for rotatably supporting said blade, said blade comprising the interrupter switch, the movable contact of said interrupter switch being mounted for reciprocation longitudinally of said blade into and out of engagement with its stationary contact, said second insulating support being rotatable and being operatively associated with the movable contact of said interrupter switch and with said blade for actuating the same, and means operatively associated with the movable and stationary portions of said interrupter switch for establishing operative connection between said second insulating support and said blade at predetermined points in the actuating of the movable contact of said interrupter switch.

45. In an air circuit interrupter, in combination, an interrupter switch and a disconnect switch in series, said switches each having a stationary contact and a movable contact, a first stationary insulating support for supporting the stationary contact of said disconnect switch, the movable contact of said disconnect switch comprising a blade movable with respect to said stationary contact, a second insulating support for rotatably supporting said blade, said blade comprising the interrupter switch, the movable contact of said interrupter switch being mounted for reciprocation longitudinally of said blade into and out of engagement with its stationary contact, said second insulating support being rotatable and being operatively associated with the movable contact of said interrupter switch for actuating the same, and resilient means confined between the movable and stationary portions of said interrupter switch for establishing operative connection between said second insulating support and said blade when the movable contact of said interrupter switch is disengaged from its stationary contact, said means resisting opening of said disconnect switch when the movable contact of said interruper switch moves away from its stationary contact and preventing closing of said interrupter switch when said disconnect switch is open.

PEDER B. HOYE.

References Cited in the file of this patent
UNITED STATES PATENTS

| Number | Name | Date |
|---|---|---|
| 1,271,555 | Faure | July 9, 1918 |
| 1,380,595 | Ritz | June 7, 1921 |
| 1,909,234 | Spurgeon et al. | May 6, 1933 |
| 1,918,901 | Farrell | July 18, 1933 |
| 2,223,731 | Lingal | Dec. 3, 1940 |
| 2,253,009 | Baker | Aug. 19, 1941 |
| 2,279,536 | Thommen | Apr. 14, 1942 |
| 2,286,131 | Wallace | June 9, 1942 |
| 2,301,746 | Parker | Nov. 10, 1942 |
| 2,306,186 | Rankin | Dec. 22, 1942 |
| 2,323,241 | Richardson | June 29, 1943 |
| 2,351,826 | Lindell | June 20, 1944 |
| 2,362,313 | Schneider | Nov. 7, 1944 |
| 2,404,957 | Graybill | July 30, 1946 |
| 2,442,190 | Bennett | May 25, 1948 |